US006457133B1

(12) United States Patent
Watari et al.

(10) Patent No.: US 6,457,133 B1
(45) Date of Patent: Sep. 24, 2002

(54) AUTOMATIC TRANSACTION APPARATUS

(75) Inventors: Kazushi Watari; Tsutomu Uematsu; Takashi Ichikawa, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/348,070

(22) Filed: Jul. 6, 1999

(30) Foreign Application Priority Data

Dec. 2, 1998 (JP) .......................................... 10-342946

(51) Int. Cl.[7] .................................................. G06F 1/26
(52) U.S. Cl. ........................ 713/320; 235/380; 235/379
(58) Field of Search .......................... 713/320; 235/380, 235/381, 379, 382, 477

(56) References Cited

U.S. PATENT DOCUMENTS

| | | | | |
|---|---|---|---|---|
| 3,868,648 A | * | 2/1975 | Levin | 340/172.5 |
| 4,142,620 A | * | 3/1979 | Sheehan | 194/78 |
| 4,645,914 A | | 2/1987 | Hiraishi | |
| 4,650,976 A | | 3/1987 | Hiraishi | |
| 5,679,945 A | * | 10/1997 | Renner et al. | 235/492 |
| 5,774,663 A | | 6/1998 | Randle et al. | |
| 6,149,064 A | * | 11/2000 | Yamaoka et al. | 235/479 |
| 6,254,005 B1 | * | 7/2001 | Smith et al. | 235/486 |

FOREIGN PATENT DOCUMENTS

| | | |
|---|---|---|
| JP | 2-216598 | 8/1990 |
| JP | 7-152844 | 6/1995 |
| JP | 8-227329 | 9/1996 |

* cited by examiner

*Primary Examiner*—Peter Wong
*Assistant Examiner*—X. Chung-Trans
(74) *Attorney, Agent, or Firm*—Staas & Halsey, LLP

(57) ABSTRACT

There is provided an automatic transaction apparatus having a receiver for receiving a plurality of types of transaction media (e.g. application form, identification) in accordance with transaction procedures from a user. When power failure is occurred while the transaction medium is in the receiver, and in case that the medium in the receiver is one that does not have to be returned to the user (e.g. application form), the receiver does not return the medium, in case that the medium in the receiver is one that have to be returned to the user (e.g. identification), the receiver provides opportunity for the user to get back the medium.

6 Claims, 7 Drawing Sheets

AUTOMATIC TRANSACTION APPARATUS

BACKGROUND OF THE INVENTION

1. Field of the Invention

The present invention relates to an automatic transaction apparatus for a financial institution, such as a bank, for performing transactions automatically, including deposit and withdrawal of money and opening of accounts, and in particular to a backup function for the automatic transaction apparatus in case of power failure.

2. Related Arts

Automatic teller machines (ATM) are installed in finance institutions, such as banks, where they function as automatic transaction apparatuses for the automatic deposit and withdrawal of money. When a user inserts a bank card or a bankbook into the automatic teller machine, the machine communicates with a host computer along a communication line, and automatically receives cash from the user or pays out cash to the user.

Recently, the automatic teller machines having an additional account opening function has been widely introduced and these machines are now being used as automatic transaction apparatuses. The automatic transaction apparatus having the account opening function automatically performs predetermined account opening procedures upon receiving a request for the account opening from the user.

Generally, when opening an account a machine must perform a number of different jobs, including a receiving an application form for the account opening, identifying an applicant (an user) by an identification, such as a driver's license or a passport. Therefore, the automatic transaction apparatus having an account opening function includes an image reader, i.e., a so-called scanner, to automatically perform those jobs. The user sets the transaction media (the application form and the identification) on the scanner, and the scanner then scans them to obtain information concerning the contents of the transaction media.

A flat bed scanner, which is currently the most popular, can be expected to be used as the image reader. The flat bed scanner has a two-dimensional scanner face, and an attached top lid which the user must open in order to set the application form or the identification on the scanner face. To ensure clear images are obtained using such a scanner, the scanner face must be prevented from becoming dirty and from being scratched. And the automatic transaction apparatus must be secured, since one which is used by the public is often in danger of being touched or of being damaged on purpose.

For these reasons, a locking mechanism is provided for the lid, and the lid is normally maintained in a locked state in order to prevent unwanted contact with the scanner face. That is, the lid is unlocked only to set an identification on the scanner face, to remove the identification from the scanner face, and to set the application form on the scanner face. Since the identification must be returned to the user, the lid is unlocked after the identification has been scanned. However, since after the application form has been scanned it is fed into the automatic transaction apparatus, the lid is not unlocked after the application scanning process has been completed. Also, when the application form or the identification is set on the scanner and the lid is closed, the lid is immediately locked in order to prevent it from being opened by mistake during the scanning process.

When a power failure occurs while the automatic transaction apparatus is in performing an account opening operation, the following problem is encountered. Assume that the power failure occurs after an identification, which must be returned to the user, has been set on the scanner face and the lid has been locked. In this case, since the lid is maintained in the locked state, the user can not remove the identification until the power has been recovered. Since extremely secret or sensitive personal information is included on the identification, and the identification normally must be carried on the user's person, the user can not leave from the apparatus with setting the identification on the scanning face. And if there is some uncertainty about when the power will be recovered, the user has no choice but to remain at the apparatus for an extended period of time until power will recover because of the possibility that the identification may be stolen by a third party. In addition, in this case the user may try to open the lid and in the process destroy the scanner.

Therefore, an urgent requirement is that the lid of a scanner be unlocked when the power failure occurs while a transaction medium which must be returned to the user (e.g. identification) is set for scanning. However, when the power failure occurs while an application form for opening an account is set on the scanner, the lid need not be unlocked because that a transaction medium which does not have to be returned to the user (e.g. application form) is set for scanning. Thus, it is demanded an automatic transaction apparatus which can control the locking and the unlocking of the lid of a scanner in accordance with the type of the transaction media set on the scanner.

SUMMARY OF THE INVENTION

It is, therefore, one objective of the present invention to provide an automatic transaction apparatus which can appropriately lock or unlock a lid in accordance with the type of the transaction medium set on a scanner when the power failure is happened.

To achieve the above objective, according to the present invention, it is provided an automatic transaction apparatus comprising: a receiver for receiving a plurality of types of transaction media in accordance with transaction procedures; a power failure detector for detecting a power failure; and a controller for determining whether the transaction medium is to be returned in accordance with the type of transaction medium which has been received by the receiver when the power failure is detected by the power failure detector, and for enabling the receiver to return the transaction medium in case that the transaction medium is to be returned.

For example, the receiver has a backup power source, and when the power failure is detected, the controller activates the backup power source to drive the receiver and return the transaction medium.

The receiver may includes a locking mechanism for normally locking the receiver and for unlocking the receiver during receiving and returning the transaction medium; and in case that a power failure is detected and the transaction medium received by the receiver is to be returned, the controller unlocks the locking mechanism in order to enable the receiver to return the transaction medium. At this time, the locking mechanism is unlocked by power received from the backup power source.

Therefore, when the receiver which has received predetermined transaction media is locked and the received transaction medium need not be returned to the user (e.g., an application form), the locked state of the receiver is maintained, even when a power failure occurs. In this manner, the unlocked state of the receiver is reduced to the minimum, and this helps to protect the apparatus and to prevent it from being intentionally damaged or destroyed. However, when the transaction medium set in the receiver is one that should be returned to the user (e.g., an identification), the backup power source internally provided for the receiver, is used to unlock the receiver, so that the transaction medium can be returned.

DETAILED DESCRIPTION OF THE PREFERRED EMBODIMENT

The preferred embodiment of the present invention will now be described. It should be noted, however, that the technical scope of the present invention is not limited to the embodiment. In this embodiment, it is described an automatic transaction apparatus including a function for depositing and withdrawing money and a function for opening an account as an example.

Figure 1:
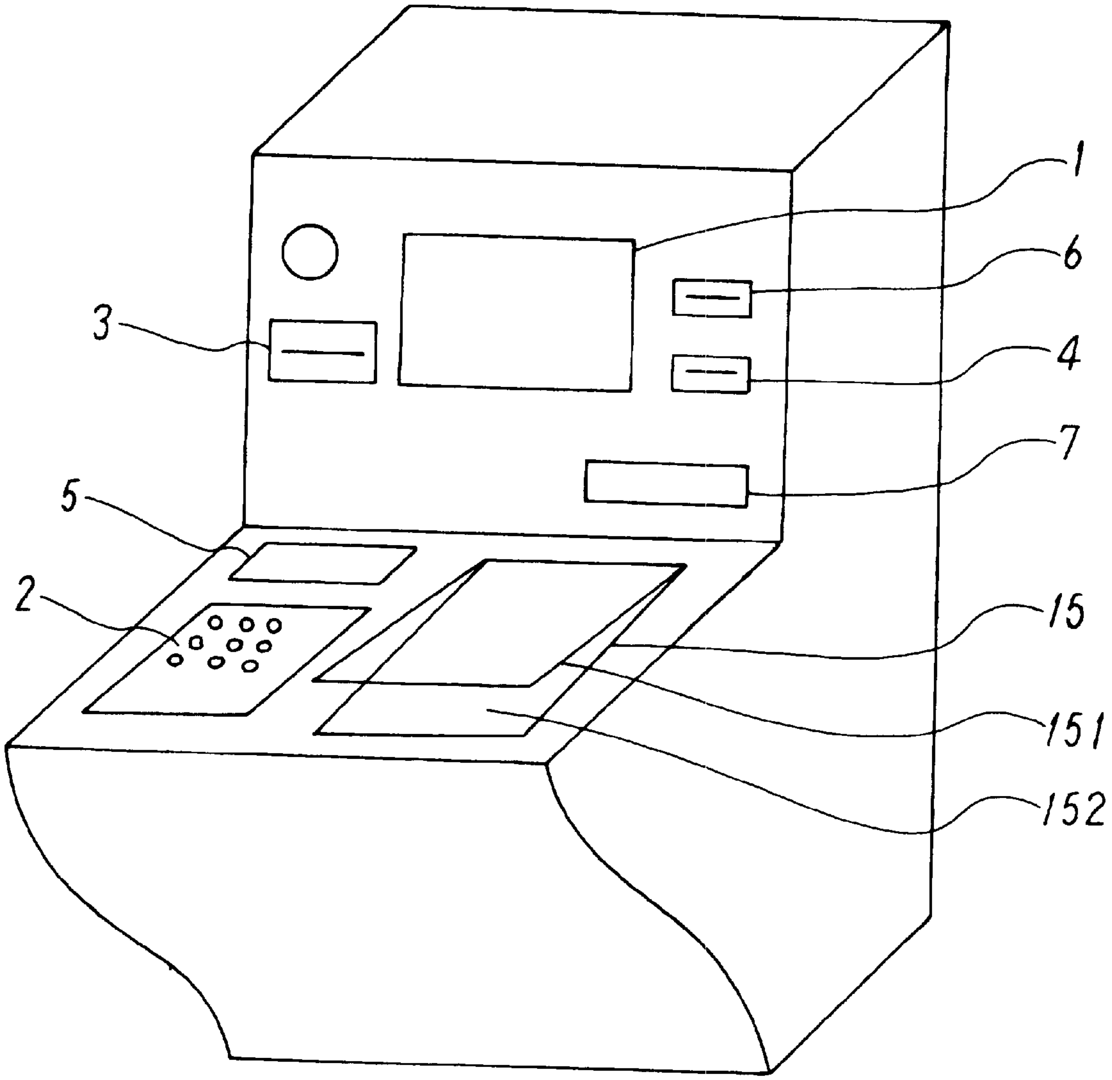
FIG. 1 is a schematic perspective view of an automatic transaction apparatus according to one embodiment of the present invention.
Figure 2:
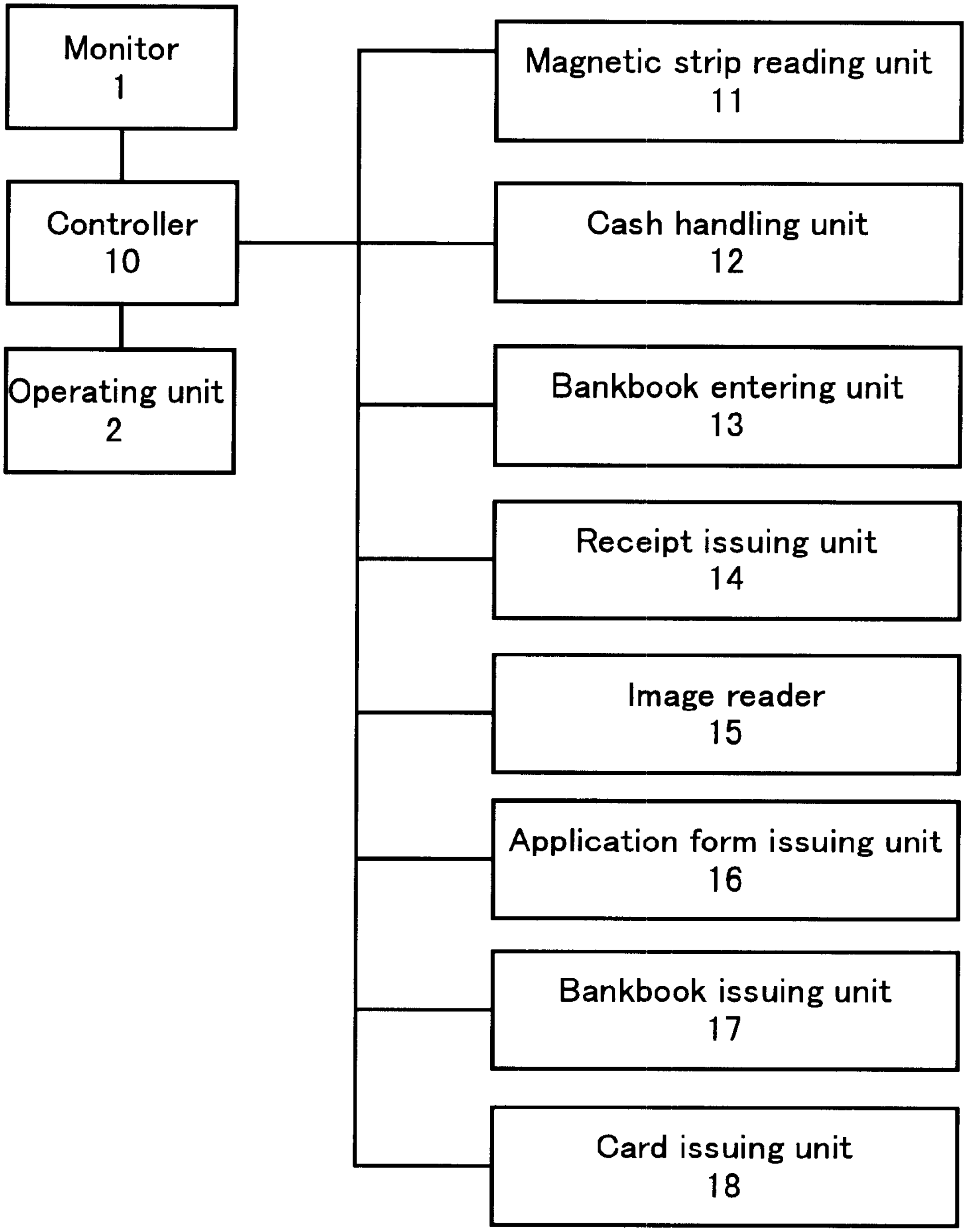
FIG. 2 is a block diagram of the automatic transaction apparatus according to the embodiment of the present invention.

FIG. 1 is a schematic, perspective view of an automatic transaction apparatus according to one embodiment of the present invention. FIG. 2 is a block diagram of the automatic transaction apparatus in FIG. 1. While referring to FIGS. 1 and 2, an explanation will now be given for a case where the user deposits or withdraws cash by using the automatic transaction apparatus. The user manipulates an operating unit 2, whereon number keys, etc., are provided, in accordance with predetermined instructions displayed on the screen of a monitor 1 in FIG. 1, and selects either the deposit or the withdrawal of cash. The transaction procedures for depositing cash, for withdrawing cash, and for opening a new account, which will be described later, are stored as programs in the memory of a controller 10 in FIG. 2, and the CPU of the controller 10 executes a corresponding program when performing these procedures.

To begin a transaction, the user inserts his or her bankbook or bank card into either a bankbook slot 3 or a card slot 4. The automatic transaction apparatus then employs an internally provided magnetic strip reading unit 11 (see FIG. 2) to read information, such as the account number of the user, from the magnetic strip attached to the bankbook or to the bank card. When a cash deposit is being made, the user places the cash in a cash port 5, and thereafter a cash handling unit 12 (see FIG. 2) inside the automatic transaction apparatus secures and counts the cash. The controller 10, which communicates on-line with a host computer, then transmits to the host computer information concerning the transaction, including the account number of the user and the amount of cash which was received, and initiates the internal process which is performed for a cash deposit. When the bankbook has been inserted, after the process has been completed the amount of the deposit is recorded in the bankbook by a bankbook entering unit 13, and the bankbook is returned to the user via the bankbook slot 3. When a bank card has been inserted, a receipt issuing unit 14 prepares a transaction receipt which is discharged through a receipt port 6, and the bank card is returned to the user via the card slot 4.

To withdraw cash, the user inserts either the bankbook or the bank card, and uses the operating unit 2 to enter an identification number and the amount of money to be withdrawn. As is described above, the controller 10 (see FIG. 2) communicates on-line with the host computer, to which it transmits information, including the account number of the user and the amount of money to be withdrawn, and initiates the process which is performed for a cash withdrawal. The cash handling unit 12 then extracts from a cash storage unit in the automatic transaction apparatus an amount in cash equivalent to the amount of the requested withdrawal, and discharges the cash through the cash port 5. The user receives the cash and also the bankbook or a receipt and the bank card.

The transaction process for opening a new account will now be described. As is shown in FIGS. 1 and 2, the automatic transaction apparatus in this embodiment includes an image reader (scanner) 15 which is used when executing the account opening process.

Figure 3:
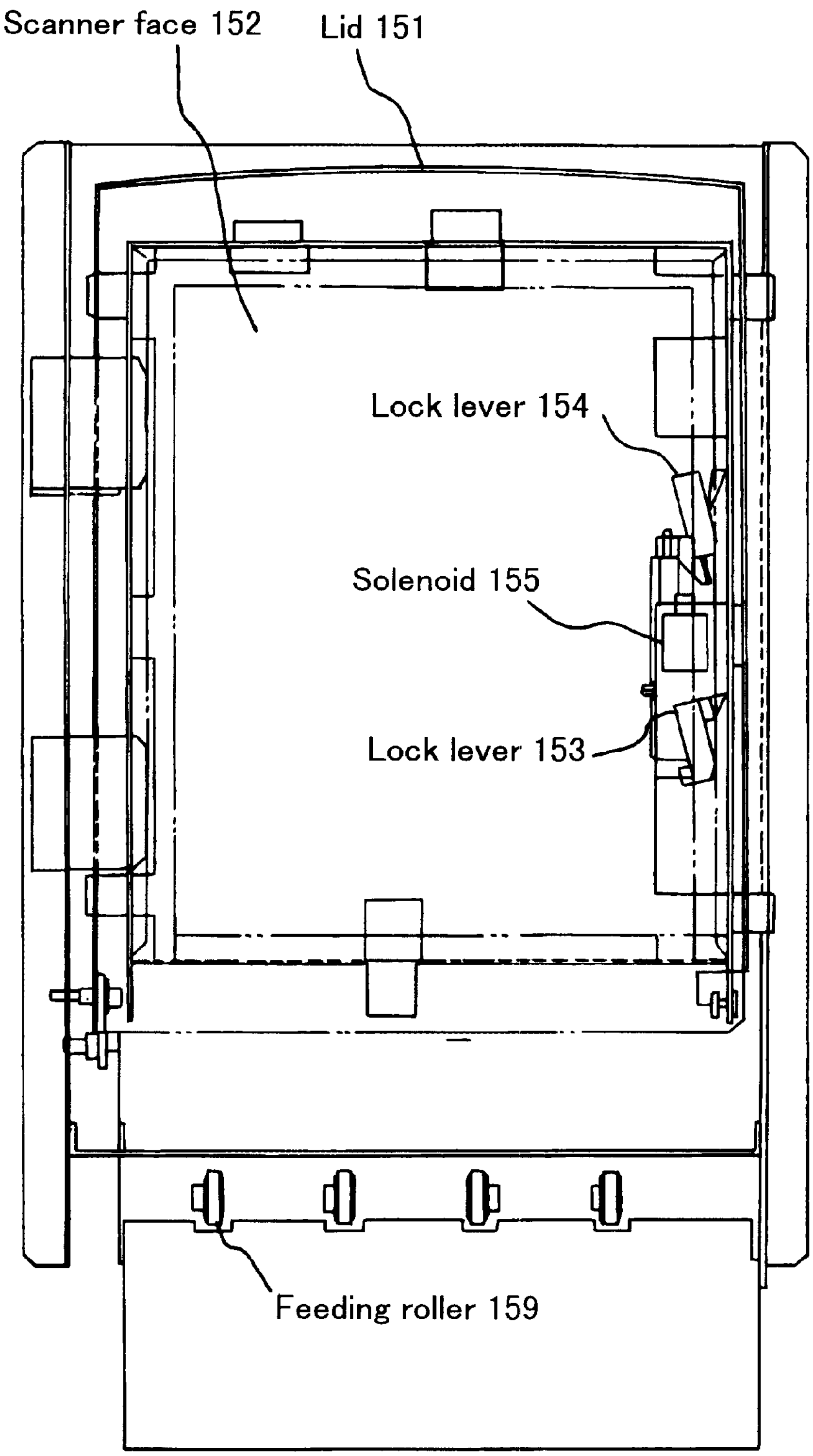
FIG. 3 is a top view of an image reader.

FIG. 3 is a partial top view of the image reader 15. The image reader 15 is a so-called flatbed scanner. The user opens a lid 151, sets predetermined transaction media (papers, card, etc), which will be described later, on a scanner face 152, and closes the lid 151. A solenoid locking mechanism, which includes lock levers 153 and 154 and a solenoid 155, is provided for the lid 151, as will be described later in detail, and normally locks the lid 151 to prevent it from being opened unnecessarily. The lid 151 is unlocked when it is necessary for a specific medium to be set on the scanner face 152 during the account opening process, which will be described later, or when the user should remove the medium from the scanner face 152.

Figure 4:
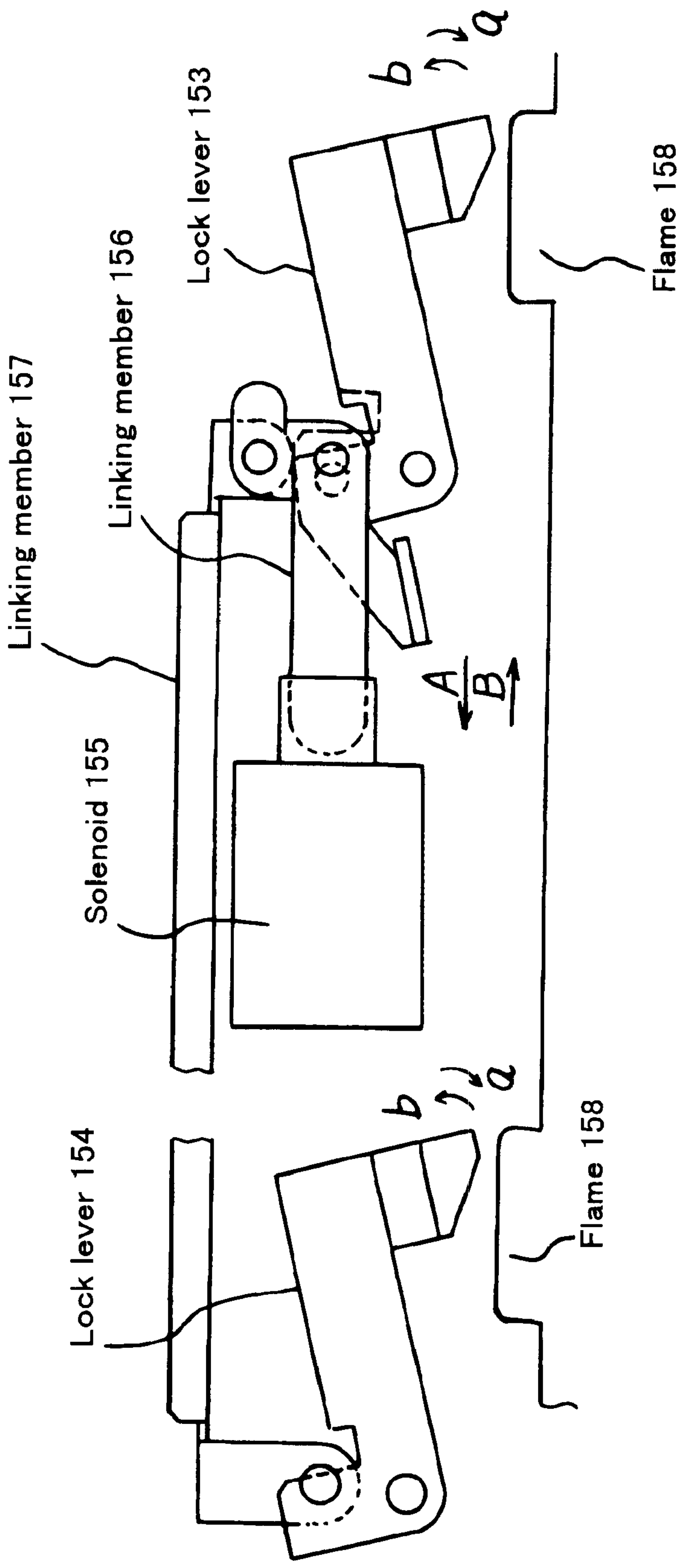
FIG. 4 is a diagram for explaining the operation of a solenoid locking mechanism.

FIG. 4, a top view of the solenoid locking mechanism in the unlocked state, is used for explaining the operation of the solenoid locking mechanism. In FIG. 4, a solenoid 155 is provided with a permanent magnet and is a self-maintaining solenoid which can maintain its current state at the time the supply of a current is stopped. When a current which flows in a predetermined direction is supplied to the solenoid 155, a linking member 156, which is connected to the lock lever 153, is attracted by the solenoid 155 in direction A. Then, the lock lever 153 moves in direction a, and the lock lever 154 also moves in direction a via another linking member 157, which is connected to the linking member 156. Thus, engagement portions (not shown), which are provided for a frame 158 on the side of the image reader, are engaged with the lock levers 153 and 154, and a locked state is provided wherein the lid 151 can not be opened. Then, when a current flowing in the direction opposite that of the predetermined direction is supplied to the solenoid 155, the polarity of the solenoid 155 is inverted, and the solenoid 155 drives the linking members 156 and 157 in direction B. Accordingly, the lock levers 153 and 154 move in direction b, and are disengaged from the frame 158, providing the unlocked state. As is described above, since the solenoid 155 is a self-maintained type, the supply of a current to the solenoid 155 is stopped once the polarity of the solenoid 155 has been changed. The supply of a current to the solenoid 155, and the direction of the current which must be supplied in order to change the polarity of the solenoid 155 are controlled by the controller 10 in accordance with the progress of the transaction procedures.

Figure 5:
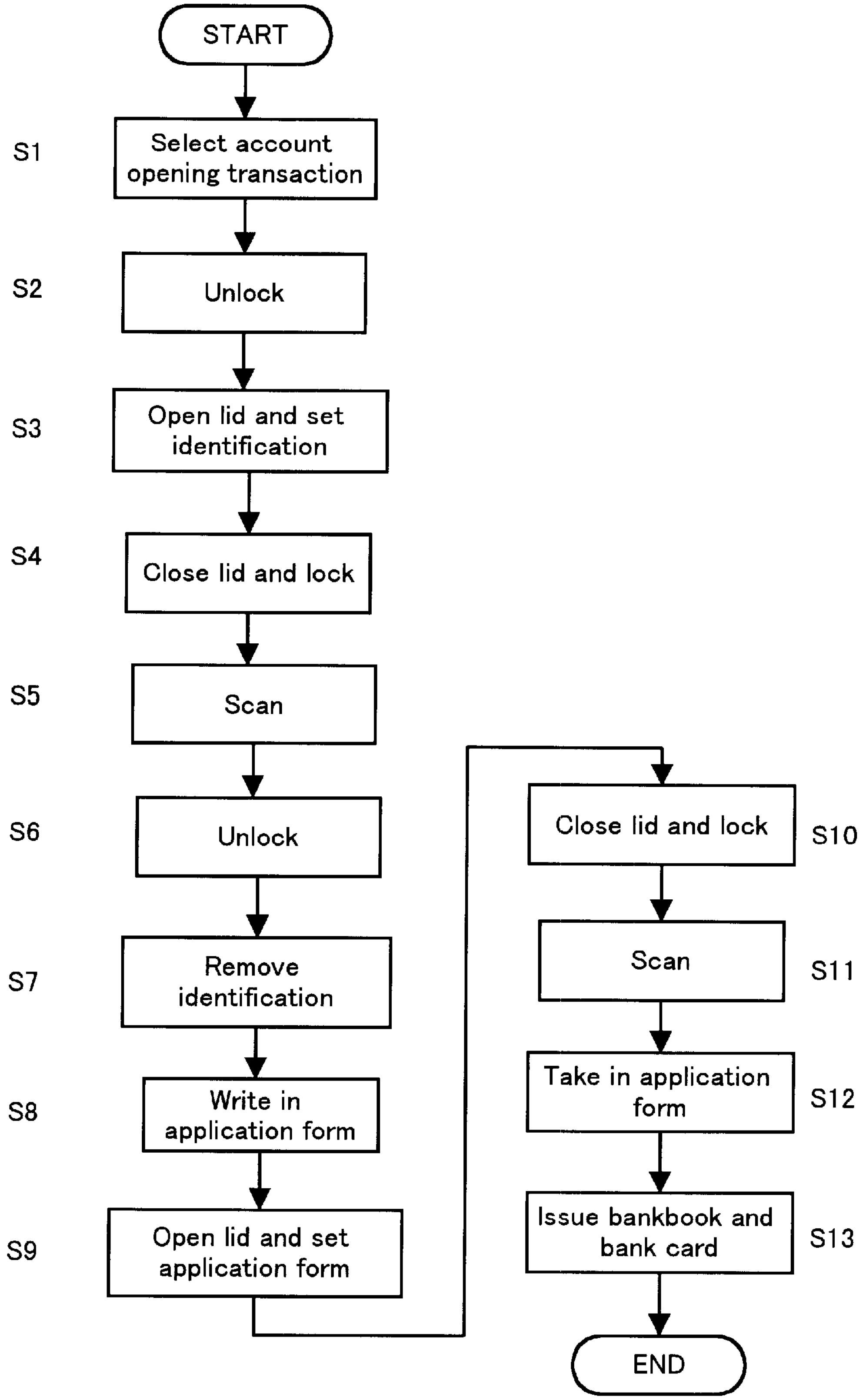
FIG. 5 is a flowchart for the transaction processing performed when a new account is opened.

FIG. 5 is a flowchart showing the transaction process performed when a new account is opened. In FIG. 5, when the user desires to open a new account, he or she manipulates the operating panel 2 and selects an account opening transaction displayed on the first selection screen of the monitor 1 (step S1).

When the account opening transaction is selected, the lid 151 of the image reader 15 is unlocked (step S2). The user then opens the lid 151 of the image reader 15, and set his or her identification on the scanner face 152 of the image reader 15 (step S3). After the user has set the identification and closed the lid 151, the solenoid locking mechanism of the lid 151 is activated and locks the lid 151 (step S4). Then, the image reading (scanning) process is performed (step S5). After the identification has been scanned, the solenoid locking mechanism releases the lid 151 from the locked state (step S6), and the user opens the lid 151 and removes the identification (step S7). When the identification is removed and the lid 151 is closed again, the lid 151 continues to be maintained in the unlocked state.

Following this, an application form issuing unit 16 (see FIG. 2) in the automatic transaction apparatus prints an account opening application form and discharges it through an application form port 7 (see FIG. 1). On the application form, the user writes required information, such as his or her name and address (step S8 ). When the user has finished filling out the application form, he or she opens the lid 151 of the image reader 15, and sets the application form on the scanner face 152 (step S9). Then after the lid 151 has been closed, it is locked by the solenoid locking mechanism (step S10) and the application form is scanned (step S11). After the scanning, the application form is fed into the automatic transaction apparatus by feeding rollers 159 provided for the image reader 15 (step S12). Under the control of the controller 10, the bankbook issuing unit 17 and the card issuing unit 18 create a bankbook and a bank card, and discharge them through the bankbook slot 3 and the card slot 4 (step S13). After the user has received the bankbook and the bank card, the transaction is terminated.

As is described above, after the user has set his or her identification or the application form on the scanner face 152, during scanning a transaction medium (the identification, the application form, etc.), the lid 151 of the image reader 15 is kept locked. It is for preventing the lid 151 from being opened by mistake during the scanning, so that a normal scanning process can be performed.

Assume that the power failure occurs while the lid 151 is locked and the scanning is being performed. In this case, the identification or the application form can not be removed from the apparatus. As is described above, while the application form need not be returned to the user, the identification must be returned, regardless of how long it takes to recover from the power failure. The characteristic operation performed by the image reader 15 in this embodiment upon the occurrence of the power failure will now be described while referring to FIGS. 6 and 7.

Figure 6:
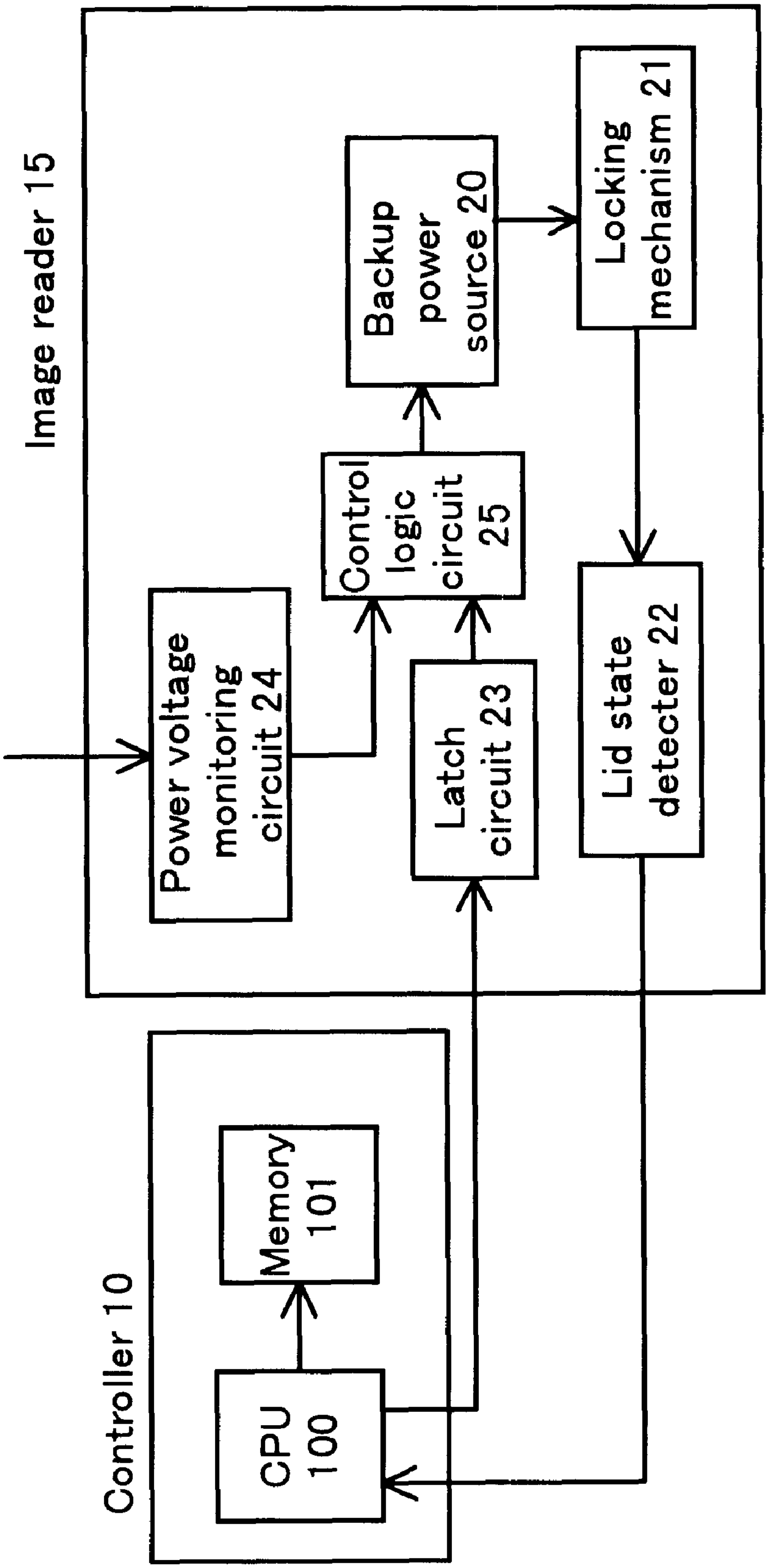
FIG. 6 is a block diagram of an arrangement for controlling the image reader when the power failure occurs.
Figure 7:
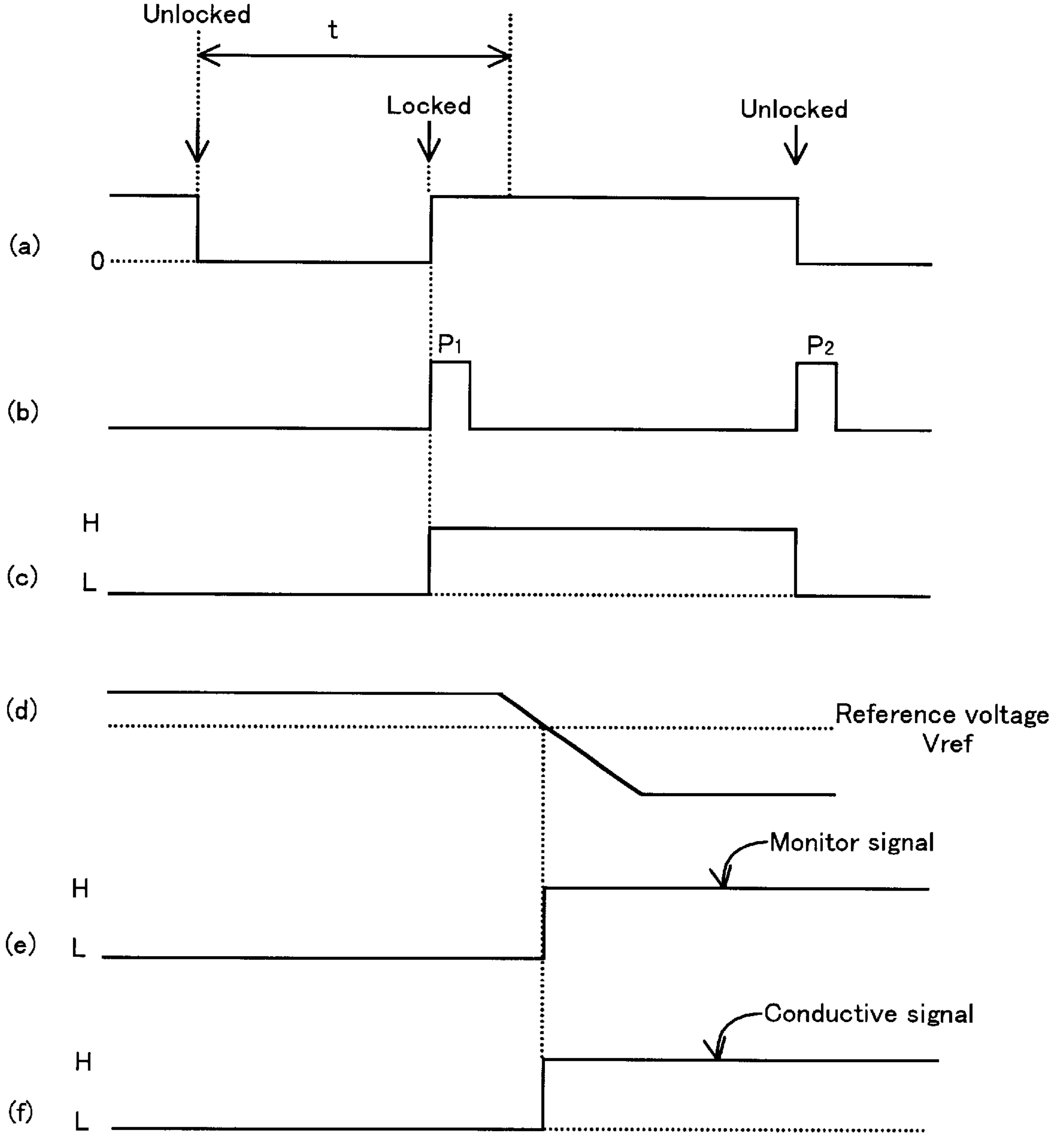
FIG. 7 is a signal timing chart for the individual components.

FIG. 6 is a block diagram of an arrangement for the electrical control of the image reader 15, and FIG. 7 is a signal timing chart for the individual components shown in FIG. 6. In FIG. 6, provided for the image reader 15 is a backup power source 20 constituted by, for example, a large capacitor. The discharge by the backup power source 20 of a current which is supplied to the solenoid locking mechanism 21 is triggered by its receipt of a drive signal from a control logic circuit 25.

In normal operation, the solenoid locking mechanism 21 receives a current from a power source (not shown), and locks or unlocks the lid 151 in accordance with control signals from the controller 10. A CPU 100 in the controller 10 sets the image reader 15 to the unlocked state at step S2 of the flowchart in FIG. 5.

When the lid 151 is unlocked and is opened by the user, its state is detected by a lid state detector 22, a circuit for detecting the open/closed state of the lid 151. When the lid 151 is closed, the lid state detector 22 is rendered conductive, and it transmits a lid closed signal to the CPU 100. When the lid 151 is opened, the lid state detector 22 is not rendered conductive, and does not transmit a signal. As is shown in FIG. 7A, therefore, when the transmission of the lid closed signal from the lid state detector 22 is temporarily stopped and then is restarted, from this the CPU 100 ascertains that an identification have been set by opening the lid 151, and that the lid 151 has been closed. The CPU 100 then locks the lid 151 and activates the image reader 15. At this time, as is shown in FIG. 7B, the CPU 100 transmits a pulse signal P1 to a latch circuit 23. Upon receiving the pulse signal P1, the latch circuit 23 changes an output signal level from level L to level H, and maintains that output level until the next pulse signal P2 is received. Therefore, as is shown in FIG. 7C, upon receiving the pulse signal P1, which the CPU 100 outputs at the same time as it locks the lid 151, the output level of the latch circuit 23 is changed to level H. When the scanning has been completed, the CPU 100 unlocks the lid 151, and also transmits a pulse signal P2 to the latch circuit 23. The output signal level of the latch circuit 23 is then returned to level L. The state of the latch circuit 23 is stored in the memory 101, and is maintained so that the latch circuit 23 is changed to level L when the account opening process is started. The state of the lid 151 is also stored in the memory 101.

A output signal from the latch circuit 23 is transmitted to a control logical circuit 25. The control logical circuit 25 also receives a monitor signal from a power voltage monitoring circuit 24. As is shown in FIG. 7D, the power voltage monitoring circuit 25 compares the power voltage with a predetermined reference voltage Vref. When the power voltage is brought lower than the reference voltage Vref due to the occurrence of the power failure, the monitor signal is changed from level L to level H, as is shown in FIG. 7E. When both the signal from the latch circuit 23 and the monitor signal from the power voltage monitoring signal 24 are changed to level H, as is shown in FIG. 7F, the control logical circuit 25 outputs a conductive signal at level H based on the logical product (AND) of the two signals, so that the backup power source 20 and the solenoid locking mechanism 21 are rendered conductive. Then, a current is supplied to the solenoid locking mechanism 21. The backup power source 20 is so set in advance that the current is supplied in the direction in which the solenoid locking mechanism 21 is unlocked. Thus, the locked state is changed to the unlocked state.

In the process at step S9 in FIG. 5, whereat an application form is set on the scanner face 152, the CPU 100 ascertains that the transmission of the lid closed signal from the lid state detector 22 has been stopped and restarted, and the lid 151 is locked. However, at this time, the CPU 100 does not transmit to the latch circuit 23 the pulse signal P1 shown in FIG. 7B. Therefore, the output signal from the latch circuit 23 in FIG. 7C is maintained at level L. And even when, upon the occurrence of the power failure, the monitor signal at level H is transmitted by the power voltage monitoring circuit 24 to the control logical circuit 25, the control logical circuit 25 does not output a conductive signal at level H based on the logical product (AND) of the two signals (see the broken line in FIG. 7F). Thus, even when the power failure occurs while the application form is being scanned, the backup power source 20 is not activated and the locked state is maintained.

As is described above, since the application form need not be returned to the user, the locked state is maintained even when the power failure occurs during the scanning of the application form. Therefore, the unlocked state of the lid of the image reader can be reduced to the minimum, so that it will be protected from being damaged or destroyed. The backup power source 20 is activated only when the power failure occurs during scanning the medium which must be returned to the user, and the lid 151 must be unlocked so that the medium can be returned.

Therefore, it is possible to increase the security of the image reader, and accordingly the security of the automatic transaction apparatus, without the user being accidentally inconvenienced when the power failure occurs.

In the automatic transaction apparatus in this embodiment, the controller 10 notifies the image reader 15 in advance of a current condition (a locked state when an identification is located in the image reader) for which a backup operation could be required (the current condition is stored in the latch circuit by using pulse signal P1 from the CPU 100). Therefore, a backup device is not required for the automatic transaction apparatus, and even when the controller 10 is disabled due to the power failure, a required backup operation can be performed.

The transaction medium which must be set on the scanner face are not limited to an application form and an identification; during the account opening process other medium may be required to be submitted. And the transactions which may be executed by the automatic transaction apparatus are not limited to account transactions. For other transactions, the automatic transaction apparatus will request the transaction media which are required, and in accordance with whether a requested media must be returned to the user, will perform the above operation when the power failure occurs.

The apparatus to be used to receive the transaction media from the user is not limited to the image reader in this embodiment; any apparatus can be employed so long as it can receive predetermined transaction media from the user and so long as it includes a locking mechanism.

As is described above, according to the present invention, when the power failure occurs while an receiver (image reader) which has received the predetermined media is locked, and in case that the medium in the receiver is one that does not have to be returned to the user (e.g., an application form), the receiver is maintained in the locked state. Therefore, the unlocked state of the receiver can be reduced to the minimum in order to prevent it from being damaged or destroyed.

In case that the medium in the receiver is one that have to be returned to the user (e.g., an identification), the backup power source provided for the receiver is activated to unlock the receiver, so that the medium can be returned.

Therefore, it is easy to ensure the security of the receiver, and of the automatic transaction apparatus, without the user being accidentally inconvenienced when the power failure occurs.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An automatic transaction apparatus comprising:

a receiver for receiving a plurality of types of transaction media in accordance with transaction procedures;

a power failure detector for detecting a power failure; and a controller for determining whether the transaction medium is to be returned, in accordance with the type of transaction medium that has been received by the receiver, when the power failure is detected by the power failure detector, for enabling the receiver to return the transaction medium in the case that the transaction medium is to be returned, and for disabling the receiver so as not to return the transaction medium in the case that the transaction medium is not to be returned.

2. The automatic transaction apparatus according to claim 1, wherein the receiver includes a backup power source, and when the power failure is detected, the controller enables the receiver to return the transaction medium by using the backup power source.

3. The automatic transaction apparatus according to claim 1, wherein the receiver includes a locking mechanism for normally locking the receiver and for unlocking the receiver during receiving and returning the transaction medium; and in case that a power failure is detected and the transaction medium received by the receiver is to be returned, the controller unlocks the locking mechanism in order to enable the receiver to return the transaction medium.

4. The automatic transaction apparatus according to claim 2, wherein the receiver includes a locking mechanism for normally locking the receiver and for unlocking the receiver during receiving and returning a transaction medium; and in case that a power failure is detected and the transaction medium received by the receiver is to be returned, the controller supplies a power to the locking mechanism by using the backup power source to unlock the locking mechanism in order to enable the receiver to return the transaction medium.

5. The automatic transaction apparatus according to claim 3, wherein the receiver comprises a lid including the locking mechanism and a main body, the locking mechanism including a solenoid and a lever linked with the solenoid; and the lever moves in accordance with a change in the polarity of the solenoid to establish a locked state by engaging with the main body.

6. A method for returning to a user certain types of transaction media upon detection of a power failure, comprising:

receiving a transaction media of a particular type from the user;

detecting a power failure;

determining whether the transaction media is of a type that is to be returned to the user;

enabling the return of the transaction media to the user if it is determined that the transaction media is of a type that is to be returned to the user; and disabling the return of the transaction media to the user if it is determined that the transaction media is of a type that is not to be returned to the user.

* * * * *